United States Patent [19]

Armbruster et al.

[11] Patent Number: 5,383,185
[45] Date of Patent: Jan. 17, 1995

[54] METHOD AND APPARATUS FOR DATA COLLISION DETECTION IN A MULTI-PROCESSOR COMMUNICATION SYSTEM

[75] Inventors: Peter J. Armbruster; James A. Stephens, both of Chandler, Ariz.

[73] Assignee: Motorola, Inc., Schaumburg, Ill.

[21] Appl. No.: 124,418

[22] Filed: Sep. 20, 1993

Related U.S. Application Data

[63] Continuation of Ser. No. 785,124, Oct. 30, 1991, abandoned.

[51] Int. Cl.⁶ .............................................. H04L 12/40
[52] U.S. Cl. ...................................... 370/85.3; 370/93
[58] Field of Search .................... 370/85.1, 85.2, 85.3, 85.6, 92, 93, 94.1; 371/55, 57.1; 340/825.5, 825.51, 825.52, 825.53

[56] References Cited

U.S. PATENT DOCUMENTS

| | | | |
|---|---|---|---|
| 4,539,677 | 9/1985 | Lo | 370/85.3 |
| 4,701,909 | 10/1987 | Kavehrad et al. | 370/85.3 |
| 4,751,701 | 6/1988 | Roos et al. | 370/85.3 |
| 4,785,396 | 11/1988 | Murphy et al. | 370/85.1 |
| 4,888,763 | 12/1989 | Hatfield et al. | 370/85.2 |

Primary Examiner—Douglas W. Olms
Assistant Examiner—Hassan Kizou
Attorney, Agent, or Firm—Frank J. Bogacz

[57] ABSTRACT

A method and apparatus for data collision detection and resolution in a multi-processor communication system. The system includes a plurality of processors coupled via a common bus. When it is required that one processor communicate with another processor, the first processor determines whether a data collision flag is set. The processor then checks a number of indicators to determine whether the identity of the transmitting processor is what it is expected to be. If a data collision is found, the processor waits a selective time before transmitting a message. The processor then repeats the data collision checking and transmitting the message to the other processor when no data collision is found. The time to wait is dependent upon the identity of the processor and is table driven.

16 Claims, 3 Drawing Sheets

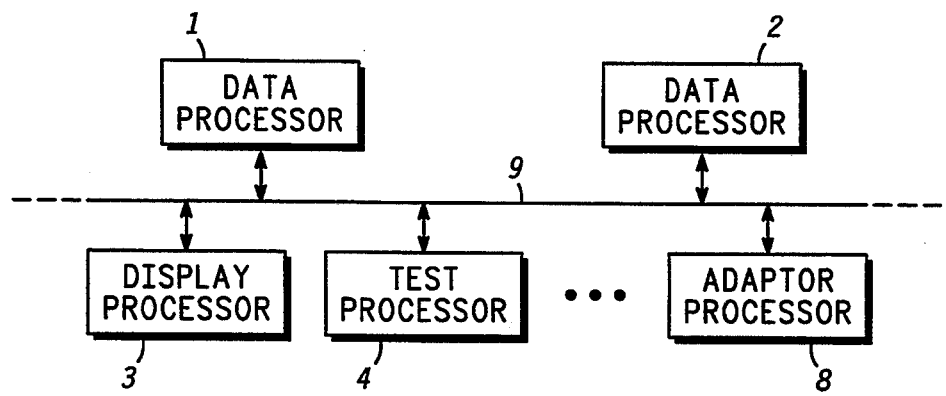
FIG. 1
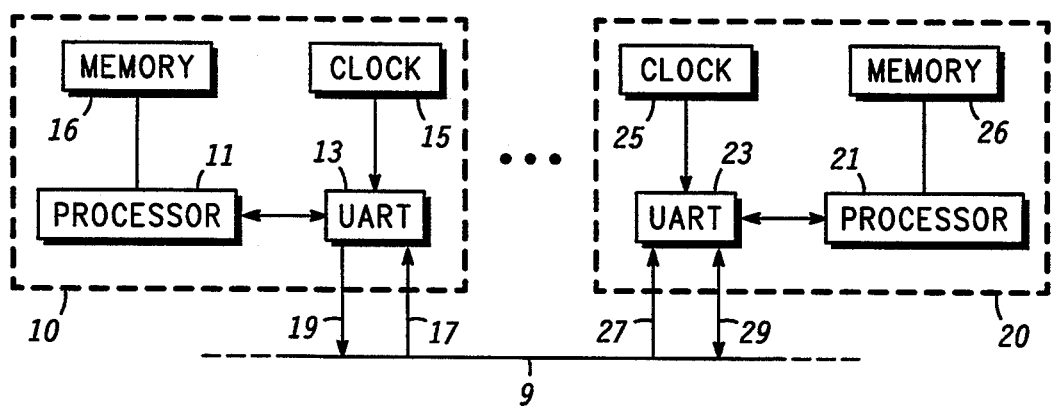
FIG. 2
FIG. 3
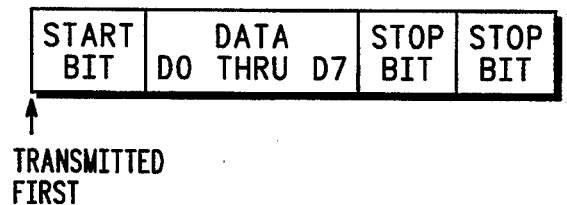
FIG. 4
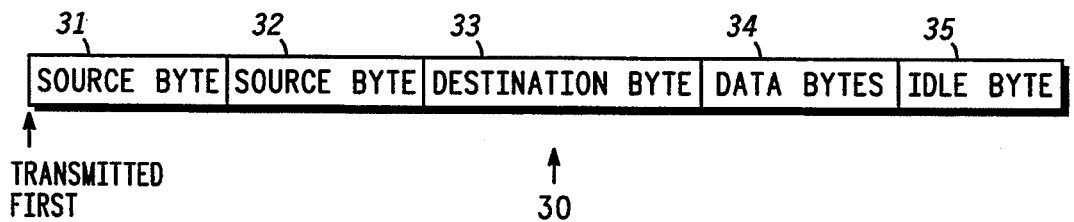

METHOD AND APPARATUS FOR DATA COLLISION DETECTION IN A MULTI-PROCESSOR COMMUNICATION SYSTEM

This application is a continuation of prior application Ser. No. 07/785,124, filed Oct. 30, 1991, now abandoned.

BACKGROUND OF THE INVENTION

The present invention pertains to inter-processor communication and more particularly to data collision detection and recovery in multi-processor communication systems.

In distributed control systems, a number of processors perform portions of the overall operation of a functional unit, such as a telephone, for example. Modern telephones are sophisticated devices which provide for a number of features such as security. In addition, such phones provide for interfacing with facsimile machines, copying machines and other telecommunication devices. The processors which control these different functions must communicate with one another. Typically, these processors are interconnected by a bus. This bus may be a serial bus and employ a CARRIER SENSE MULTIPLE ACCESS WITH COLLISION DETECTION (CSMA/CD) bus protocol.

These multi-processor communication systems do not detect data collisions on the bus under all conditions. Further, such systems do not provide an efficient arrangement for settling conflicts between processors involved in a data collision.

Accordingly, it is highly desirable to provide a multiple processor communication system which detects data collisions under all conditions and resolves the collisions by efficiently permitting processors to communicate in a prioritized fashion.

SUMMARY OF THE INVENTION

In accordance with the present invention, a novel multi-processor communication system for detection of data collisions is shown.

A method for data collision and resolution in a multi-processor communication system which includes a plurality of processors coupled by a bus, first determines by a processor whether a communication with another processor is required. The processor determines whether a previous data collision occurred. Each of the processors check a plurality of source indicators of the message to find whether a data collision occurred. If the data collision occurred, the processor waits a selective time. The processor then repeats the steps of determining whether a previous data collision occurred, checking to find a data collision, and waiting a selective time, if the data collision is observed. The processor then transmits the message to at least one other processor if no data collision occurred.

A multi-processor communication system includes a plurality of processors coupled by a bus. A data collision detection arrangement has a plurality of transmitters coupled to the bus. Each of the transmitters is coupled to a corresponding one of the processors. Each of the transmitters transmits messages from a source processor to at least one destination processor. The data collision detection arrangement also has a plurality of receivers coupled to the bus. Each of the plurality of receivers is coupled to a corresponding one of the processors. The receivers receive the transmitted messages via the bus. Each of the processors determines whether a data collision occurred by examining a source processor indicator of the message. The source processor waits a selective time, if a data collision occurred. Each of the transmitters operates to continue transmitting the message, if no data collision occurred.

BRIEF DESCRIPTION OF THE DRAWINGS

FIG. 1 is a block diagram of a multi-processor communication system in accordance with the present invention.

FIG. 2 is a block diagram of the multi-processor arrangement of FIG. 1 in accordance with the present invention.

FIG. 3 is a character format of a multi-processor communication system in accordance with the present invention.

FIG. 4 is a bus protocol data layout in accordance with the present invention.

DESCRIPTION OF THE PREFERRED EMBODIMENT

Figure 5:
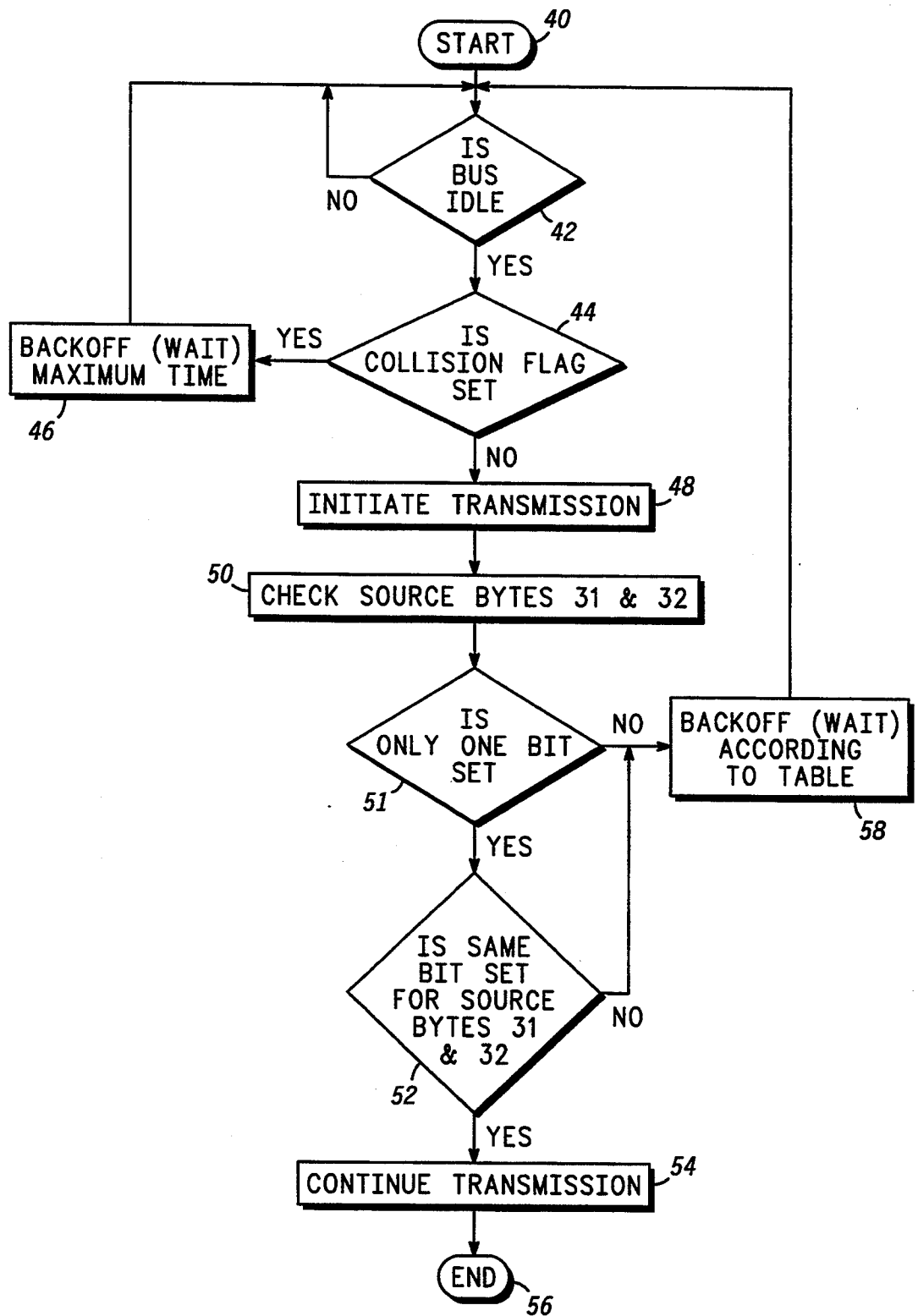
FIG. 5 is a flow chart of a collision detection method in accordance with the present invention.

FIG. 1 is block diagram of a multi-processor communication arrangement. The processor arrangement depicted in FIG. 1 is suitable for implementation in secure telephone terminals. One such secure telephone terminal is the super economic terminal or SET manufactured by Motorola, Inc. As shown in FIG. 1, processors 1-8 are shown connected to one another via bus 9. Processors 1-4 and 8 are shown. The ellipses represent processors 5-7 which are not shown for the sake of simplicity. Processors 18 communicate by sending messages to one another.

Data processors 1 and 2 perform common communications functions between the SET terminal comprising processors 1-8 and other SET terminals (not shown) via a communication network (not shown). Data processors 1 and 2 may be red and black processors for secure telephone terminal applications. Display processor 3 controls a display unit (not shown) associated with the secure telephone terminal. Test processor 4 provides for testing and maintenance of the secure telephone terminal. Adaptor processor 8 and the other processors (not shown) provide for interconnection to and communication with such external devices to the telephone such as facsimile and copying apparatus. This interconnection of processors 1-8 via bus 9 facilitates interprocessor communications of command-type information. This processor architecture is a distributed control architecture. That is, there is no master control processor. Distributed control processing allows for completely asynchronous operation of each of the processors within the terminal shown in FIG. 1.

Bus 9 is a zero dominant bus. Each of the processor 1-8 communicate via a half-duplex arrangement. The processors may include such processors as the Motorola DSP56001 or the 68HC11. The bus includes a single lead open collector path to which each of the processors are connected. Bus 9 is based on the 11-bit multi-drop mode of the DSP56001 and 68HC11 processors.

The bus protocol will use carrier sense multiple access with collision detection (CSMA/CD) for all message transfers among the processors. When a processor requires to transmit a message, the processor must first listen to the bus to insure that the bus is not presently in use (carrier sense). If the bus is available, the processor may begin to transmit. If more than one processor begins to transmit simultaneously, a collision of data will result. All processors connected to the bus will detect a collision. In order to detect a collision, each processor receives and interprets the first two characters for framing errors and pattern violations. If the first two characters are received correctly, that indicates that the transmission is proceeding collision free. If a collision occurs, the transmitting processors will abort the transmission and "back-off" the bus for a particular amount of time prior to attempting to retransmit the message. A threshold time limit to wait before the retransmission of the message may be set. For the secure telephone terminal described herein, a maximum of three retrys is permitted. A fourth collision indicates that a bus fault exists and the transmitting processor will no longer attempt to transmit messages until the processor is reset. The processor then declares itself faulty.

Referring to FIG. 2, a more detailed description of the processor arrangement of FIG. 1 is shown. Two processors 10 and 20 are shown. Processors 10 and 20 correspond to two of the processors shown in FIG. 1. The other processors are eliminated for the sake of simplicity of explanation. Processor 10 includes processor 11 which is connected to UART (universal asynchronous receiver transmitter) 13. Processor 11 is connected to memory 16. Clock 15 is also connected to UART 13. UART 13 is connected to bus 9 via receive lead 17 and transmit lead 19.

Similarly, processor arrangement 20 includes processor 21 which is connected to UART 23. Processor 21 is also connected to memory 26. Clock 25 is also connected to UART 23. UART 23 is connected to bus 9 via receive lead 27 and transmit lead 29. Up to six other processors would be connected in a similar fashion. As previously mentioned, the processors may be different processors such as the DSP56001 or the 68HC11. Different UARTs may be employed. Each UART which is used must have a character format of 11 bits. Clocks 15 and 25 and any other clock corresponding to another processor arrangement provide the same frequency to each of the UARTs with a plus or minus 2 percent drift.

FIG. 3 depicts the character format for messages transmitted among the processors 1-8 via bus 9. The character (byte) formatting includes one start bit, followed by 8 data bits, D0-D7, followed by two stops bits. Since bus 9 is a zero dominant bus, it is typically at logic 1. Therefore, the start bit makes a transition from logic 1 to logic 0. Data bits D0-D7 may take on either value logic 1 or logic 0. The two stop bits are each at a logic 1 value. Therefore, on consecutive characters a transition is always made from logic 1 to logic 0 when a new character is sent for transmission.

Referring to FIG. 4, a typical message 30 is shown. Message 30 which may be sent from one processor to another includes source byte 31 followed by another duplicate (of byte 31) source byte 32 followed by a destination byte 33. Next, a number of data bytes 34 follow. Lastly, an idle byte 35 ends the message 30.

The source bytes 31 and 32 are the identity of the processor which is transmitting the message. The destination byte 33 is the identity of the processor which is to receive the message. The values for the source byte and destination byte which identify each of the processors 1-8 are shown below in Table 1. Table 1 is stored in memory 16, 26 and others (not shown). The address field byte includes bits D0-D7 with D0 being the low order and D7 being the highest order bit. For each of the processors a particular bit in the address field byte is set to logic 1. For example, for processor 1, D0 is set to logic 1. For processor 2, D1 is set to logic 1, etc. An address field byte of all zeros is a illegal address. A processor receiving a source byte 31 or 32 with a framing error or an illegal address indicates that there has been a data collision on bus 9.

TABLE 1

| Address Field (BYTE) | | | | | | | | Destination Processor |
|---|---|---|---|---|---|---|---|---|
| D0 | D1 | D2 | D3 | D4 | D5 | D6 | D7 | |
| 0 | 0 | 0 | 0 | 0 | 0 | 0 | 0 | Illegal Address |
| 1 | 0 | 0 | 0 | 0 | 0 | 0 | 0 | Processor 1 |
| 0 | 1 | 0 | 0 | 0 | 0 | 0 | 0 | Processor 2 |
| 0 | 0 | 1 | 0 | 0 | 0 | 0 | 0 | Processor 3 |
| 0 | 0 | 0 | 1 | 0 | 0 | 0 | 0 | Processor 4 |
| 0 | 0 | 0 | 0 | 1 | 0 | 0 | 0 | Processor 5 |
| 0 | 0 | 0 | 0 | 0 | 1 | 0 | 0 | Processor 6 |
| 0 | 0 | 0 | 0 | 0 | 0 | 1 | 0 | Processor 7 |
| 0 | 0 | 0 | 0 | 0 | 0 | 0 | 1 | Processor 8 |

Each processor on bus 9 checks every message that is transmitted. In this way, each processor determines whether the message is for that processor and whether a data collision has occurred. If a data collision has occurred, each processor sets its own local data collision flag.

Referring to FIG. 5, the process for transmitting a message from one processor to another is shown. This process is executed by each of the processors when it is determined they need to transmit a message to another processor. When a processor determines that data transmission is required, block 40 is entered. Block 40 transfers control to block 42. Block 42 determines whether the bus 9 which interconnects the processors is idle. If the bus is busy, block 42 repeats the testing of whether the block is idle until such time as it becomes idle. When the bus is idle, block 42 transfers control to block 44 via the YES path. The bus test of block 52 may be implemented in various ways. These particular implementations will be shown later.

Next, each processor checks its own local collision flag to determine whether it is set. If the processor's local collision flag is set, block 44 transfers control to block 46 via the YES path. This indicates that other processors were transmitting messages when a data collision occurred. Block 46 then backs-off the bus (waits a predetermined maximum time before attempting to transmit again). Block 46 then after waiting transfers control to block 42 to determine whether the bus is idle.

If the collision flag is not set, block 44 transfers control to block 48 via the NO path. Block 48 initiates the data transmission according to the protocol shown in FIG. 4. The UART (universal asynchronous receiver transmitter) begins transmitting data over the bus. The receiver portion of the UART reads the transmitted data including source bytes 31 and 32, block 50. Block 51 determines whether only one bit is set in each of the source bytes. As previously mentioned, the source bytes identify the processor who is transmitting the data. Valid source bytes for each of the processors are shown in Table 1. If a framing error or illegal address is detected, this indicates a data collision occurred. For the data collision situation block 51 transfers control to block 58 via the NO path. If only one bit is set in each of the source bytes, block 51 transfers control to block 52 via the YES path. Optionally, block 52 determines whether the same bit is set for each of the source bytes 31 and 32. If the same bits are not set, block 52 transfers control to block 58 via the NO path. Block 58 backs-off the bus (waits a predetermined time) according to Table 2. The times set in Table 2 for each of the processors including the maximum time used by block 46 are organized such that N9, the maximum time, is greater than any of the other back-off times, N8-N1. N8 is greater than N7, N7 is greater than N6, etc. As a result, if block 51 and block 52 detected a NO result to the test, this indicates that the particular processor has had a data collision with another processor. Each of the processors involved then backs-off a predetermined amount of time according to Table 2 before attempting to retransmit. In this way, processor 1 is given priority over all the other processors. Processor 2 is given priority over all the other processors except processor 1 and so forth. Further, Table 2 may be dynamically changed to give particular processors priority over other processors. Also, the maximum time N9 may be dynamically changed to be a longer or shorter time so as it is greater than each of the other times N1-N8.

TABLE 2

| Processor | Back-off Time (in character times) |
| --- | --- |
| Processor 1 | N1 |
| Processor 2 | N2 |
| Processor 3 | N3 |
| Processor 4 | N4 |
| Processor 5 | N5 |
| Processor 6 | N6 |
| Processor 7 | N7 |
| Processor 8 | N8 |
| Maximum Time | N9 |

If only one bit is set in each of the source bytes and it is the same bit set for both source bytes 31 and 32, block 51 transfers control to block 54 via the YES path. Since no data collisions have been detected, block 54 continues the message transmission of the protocol shown in FIG. 4. The process is then ended, block 56.

Figure 6:
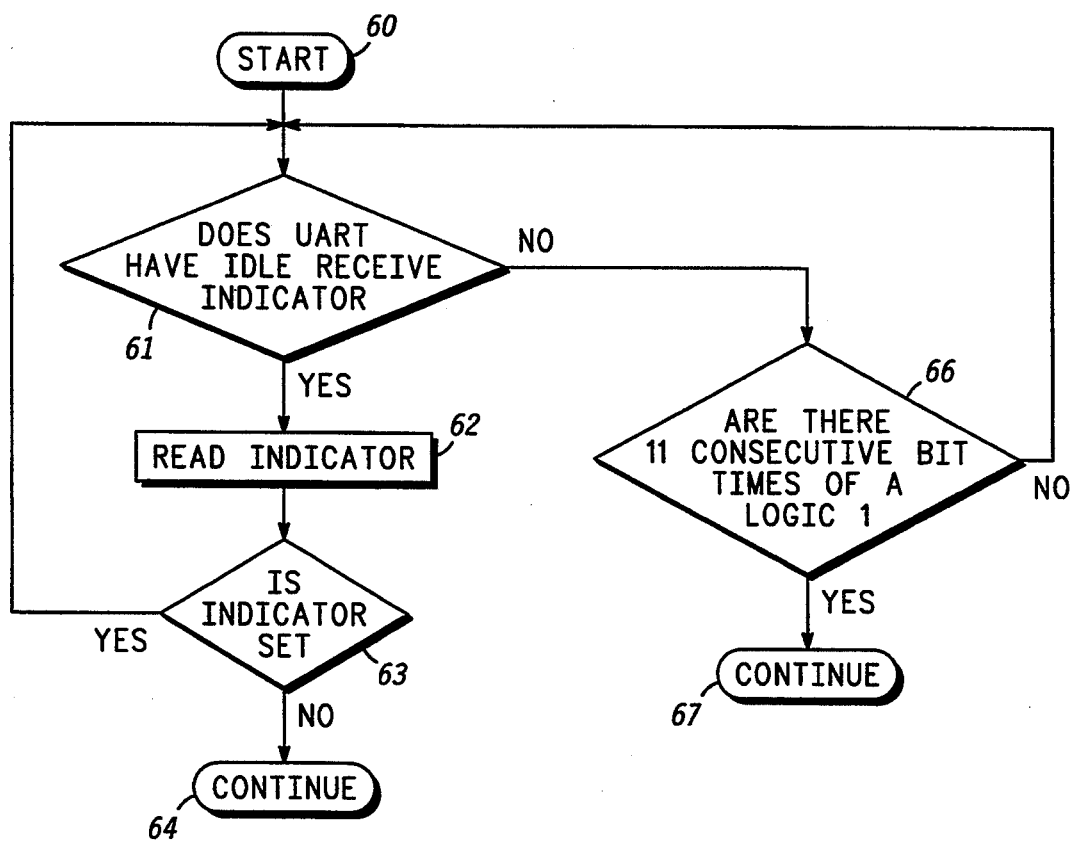
FIG. 6 is a flow chart of a bus idle detection scheme in accordance with the present invention.

FIG. 6 depicts the details of the bus idle test, block 42 of FIG. 5. The bus idle test is entered and block 60 transfers control to block 61. This testing allows UARTs with and without idle receive indicators to be employed in the system design. Block 61 determine whether the UART associated with this processor has an idle receive indicator, block 61. If the particular UART has an idle receive indicator, block 61 transfers control to block 62 via the YES path. The processor then reads the indicator from the UART, block 62. Block 63 tests the indicator to determine whether it is set. If the indicator is not set, block 63 transfers control to block 64 via the NO path. Block 64 continues on with the process, that is, block 44 is given control as shown in FIG. 5. If the indicator is set, block 63 transfers control to block 61 via the YES path and the bus idle process is repeated until the bus becomes idle.

If the UART did not have a receive indicator, block 61 transfers control to block 66 via the NO path. Block 66 determines whether there are eleven consecutive bit times of logic 1. Since the bus is at logic 1 unless the processors are communicating, eleven consecutive bit times of logic 1 indicate that the bus is idle. If there are eleven consecutive bit times of logic 1, block 66 transfers control to block 67 via the YES path and the process continues. This corresponds to the transfer from block 42 to block 44 of FIG. 5. If the bus is busy, eleven consecutive bit times of logic 1 will not be seen and block 66 transfers control to block 61 via the NO path. The bus idle status will then be reexamined until the bus is idle. This corresponds to the NO path of block 42 of FIG. 5.

Data collisions on the bus are affected by the following system designs. First, all processors may transmit and receive asynchronously from the other processors. Second, transmitting and receiving bit clocks may vary plus or minus 2 percent for a worst case difference of 4 percent between two transmitting processors. Third, the processors sample the data on the bus by detecting the start bit of the eleven-bit character and sampling the data bits at the mid-bit point with reference to the falling edge of the start bit.

If there is no clock skew (clock rate difference) then mid-bit sample detects data collisions. In order to detect data collisions given the above system design (referencing the falling edge of the start bit of the first transmitting processor as a reference point) and assuming a maximum 4 percent clock skew, there are three conditions which must be analyzed. These conditions are: (1) transmission starting from within zero to 50 percent (of a bit time) from the reference edge; (2) transmissions starting after 86 percent (of a bit time) from the reference edge; and (3) transmissions starting from within 51 percent to 85 percent (of a bit time) from the reference edge. For the first condition of from zero to 50 percent, each processor will detect an invalid source byte within the first character. This is due to the mid-bit sampling approach which, for example, will detect an all zeros source byte and interpret this as a data collision.

For the second condition in which there is a greater than 86 percent shift in the transmission from the reference edge, a data collision will be detected as an invalid source byte or a framing error within the first character. A framing error within the first character will occur because the 4 percent drift between the two reference clocks over bits 2-10 of the first character of the source byte will cause the leading edge of both processors bit 10 to be within 36 percent (9 bits+4 percent/bit) of each other. To detect a framing error, the leading edge of one of the processors' bit 10 must cross the mid-bit sampling point which is at the 50 percent point of bit 10. Therefore, if one processor starts a transmission 87 percent past the reference point and has a 36 percent faster clock, the final edge will be 51 percent (87-36) into bit 10 of the first character. All processor receivers will therefore detect a framing error from their associated UART. To insure a framing error will occur, two stop bits, each of a logic 1 have been employed as shown in FIG. 3.

For the third condition mentioned above, that is a data collision within 51 to 81 percent of the start bit, a data collision may not be detected as an invalid source byte or a framing error within the first character of the byte. Consider the following example. Bits 10 and 11 of each character will always be set to logic 1. Therefore, a drift of 36 percent can occur over 9 bits (4 percent drift per bit times 9 bits). This 36 percent drift can occur prior to bit 10. If one processor starts a transmission 51 to 86 percent past a reference point of the other processor and the first processor makes up a 36 percent difference due to a faster clock, the transmitted bit 10s of each processor will be within 15 (51-36) to 50 percent (81-36) of one another. Since each bit is sampled mid-bit (50 percent into the bit) each processor will see bit 10 as a valid stop bit and a framing error will not be detected. If the second processor begins transmitting 51 to 86 percent past the reference point of the first processor and the two processors have a source byte identity of two adjacent bits, then all receiving processors will see a valid source byte. This data collision will not be detected. All processors on the bus will begin sampling the data at mid-bit times with reference to the starting bit of the first processor. After 9 bits, processors A and B will have caught up allowing for the maximum 4 percent drift per bit. For bit 10, the difference between the two processors will be 50 percent of a bit time. As a result, all processors will sample bit 10 as a valid stop bit and a data collision will not be detected. In order to overcome the problem of the third condition, the source byte which uniquely identifies each processor, is repeated as shown in FIG. 4, item 32, by each processor. Allowing again for the maximum drift of 4 percent per bit, the second character transmitted by each processor will have leading edges (the 12th transmitted bit) which differ by less than 33 percent (81-48). This error condition will be detected by the first condition as mentioned above.

As can be seen from the above description, a multi-processor communication system is shown which detects data collisions and provides for prioritized access to the system data bus. This communication system provides for prioritizing subsequent communications among the processors according to a table-driven dynamically changeable arrangement. In addition, this system provides for processors which were not directly involved in a data collision from intervening with a request for access to the system bus prior to resolution of data collisions between other processors by having the non-colliding processor wait a maximum time limit before again attempting to transmit a message. This arrangement provides a multi-processor communication system in which data collisions are rapidly detected and communication among the processors is established by a prioritized arrangement. This prioritized arrangement is particularly useful in situations in which a number of processors are each performing a dedicated portion of the overall function of the system.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A method for data collision protection and resolution in a multi-processor communication system including a plurality of processors coupled by a bus, said method comprising the steps of:
   first determining by one processor of said plurality of processors that communication is required with at least one other processor of said plurality of processors via a first message on said bus;
   second determining by said one processor whether a data collision flag indicates that a previous data collision occurred from a transmission of another message;
   maximum waiting by said one processor a maximum time, if said previous data collision occurred;
   initiating by said one processor transmission of said first message, if said data collision flag indicates a previous data collision has not occurred;
   checking to determine whether a new data collision occurred during transmission of said first message by each of said plurality of processors by checking a plurality of source indicators in said first message, said source indicators indicating an identity of a processor transmitting said first message;
   continuing transmitting by said one processor said first message to said at least one other processor, if no new data collision is determined;
   waiting by said one processor a selective time, if said new data collision of said first message is determined; and
   repeating by said one processor said steps of first determining, second determining, initiating, checking, continuing transmitting, and waiting if said new data collision of said first message is determined.

2. A method for data collision detection and resolution as claimed in claim 1, wherein before second determining step there is further included the steps of:
   third determining by said one processor whether said bus is idle prior to transmitting; and
   second repeating by said one processor said step of third determining until said bus becomes idle, if said bus is not idle.

3. A method for data collision detection and resolution as claimed in claim 2, wherein said step of checking includes the steps of:
   second checking by said one processor at least two of said source indicators from said transmitted message; and
   fourth determining by said one processor whether only one-bit is set in each of said at least two source indicators of said message.

4. A method for data collision detection and resolution as claimed in claim 3, wherein said step of second checking further includes the step of fifth determining by said one processor whether, said one-bit set in each of said at least two source indicators is in a same bit position within said source indicators.

5. A method for data collision detection and resolution as claimed in claim 4, wherein said step of waiting includes the steps of:
   reading by said one processor from a table a value representing an amount of time; and
   third waiting by said one processor said amount of time before retransmitting said first message.

6. A method for data collision detection and resolution as claimed in claim 5, wherein said amount of time depends upon the identity of said one processor.

7. A method for data collision detection and resolution as claimed in claim 2, wherein said step of third determining includes the steps of:
   sixth determining by said one processor whether a universal asynchronous receiver/transmitter (UART) coupled to said one processor includes an idle receive indicator;
   reading by said one processor a value of said idle receive indicator, if said UART includes a idle receive indicator;
   seventh determining by said one processor whether said idle receive indicator is set, which indicates said bus is busy;
   repeating by said one processor said steps of sixth determining, reading said idle receive indicator, and seventh determining, if said idle receive indicator is set.

8. A method for data collision detection and resolution as claimed in claim 7, wherein said third determining step further includes the steps of:
   finding by said one processor from said bus through said UART a particular number of consecutive bits of a particular logic value, which indicate said bus is idle; and
   repeating by said one processor said step of finding until said particular number of consecutive bits of said particular logic value are found.

9. In a multi-processor communication system including a plurality of processors coupled by a bus, a data collision detection arrangement comprising:
   a plurality of means for transmitting coupled to said bus and each of said plurality of means for transmitting being coupled to a corresponding one of said plurality of processors;
   a plurality of means for receiving coupled to said bus and each of said plurality of means for receiving being coupled to a corresponding one of said processors, said means for receiving a transmitted message via said bus;
   said plurality of said means for transmitting including means for initiating transmitting a first message from a source processor to at least one destination processors;
   means for determining by each of said processors whether a data collision occurred between said first message and other messages by examining a source processor indicator in said first message;
   said means for determining including first means for checking by each of said plurality of processors at least two consecutive source words comprising said source processor indicator for determining that each source word has only one bit set to a particular logic value, each bit of said source word indicating an identity of a particular one of said plurality of processors;
   means for waiting by said source processor a selective time before transmitting said first message again, if a data collision is determined; and
   said means for continuing transmitting said first message of said source processor operating to continue transmission of said first message, if no data collision is determined.

10. A data collision detection arrangement as claimed in claim 9, wherein each of said plurality of means for transmitting includes universal asynchronous receiver transmitter UART means coupled to said bus, said UART means operating to transmit a plurality of characters comprising said transmitted message.

11. A data collision detection arrangement as claimed in claim 9, wherein each of said plurality of means for receiving includes universal asynchronous receiver transmitter UART means coupled to said bus, said UART means operating to receive a plurality of characters comprising said transmitted message.

12. A data collision detection arrangement as claimed in claim 9, wherein said means for determining further includes second means for checking by each of said plurality of processors said at least two consecutive source words for determining that the bit set in each of said source words is in a same bit position.

13. A data collision detection arrangement as claimed in claim 12, wherein said means for waiting includes:
   means for reading from a table by each of said plurality of processors one of a plurality of time values corresponding to a time period for said source processor to wait before retransmitting said first message, each value of said table corresponding to one of said plurality of processors;
   means for inhibiting transmission of said first message by said source processor for said time period corresponding to said time value of said table;
   means for retransmitting by said source processor said first message after said time period expires.

14. A data collision detection arrangement as claimed in claim 13, wherein there is further included means for detecting by said source processor that a previous data collision has occurred.

15. A data collision detection arrangement as claimed in claim 14, wherein said means for detecting further includes second means for waiting by said source processor, said second means for waiting a particular time limit before retransmitting said first message if a collision flag is previously set to a first logic state, said particular time limit being greater than each of said plurality of said values of said table.

16. A data collision detection arrangement as claimed in claim 13, wherein there is further included a plurality of memory means each one of said memory means coupled to a corresponding one of said plurality of processors, said memory means for storing said table.

* * * * *